No. 818,872. PATENTED APR. 24, 1906.
L. W. CLARK.
BROODER.
APPLICATION FILED AUG. 21, 1905.

Witnesses:—

Inventor,
Louis W. Clark
By Geo. H. Strong, Atty.

UNITED STATES PATENT OFFICE.

LOUIS W. CLARK, OF PETALUMA, CALIFORNIA.

BROODER.

No. 818,872.  Specification of Letters Patent.  Patented April 24, 1906.

Application filed August 21, 1905. Serial No. 275,021.

*To all whom it may concern:*

Be it known that I, LOUIS W. CLARK, a citizen of the United States, residing at Petaluma, in the county of Sonoma and State of California, have invented new and useful Improvements in Brooders, of which the following is a specification.

My invention relates to brooders used in raising young chicks.

Incubator-bred chicks are often very delicate, especially for the first week or ten days, and a large proportion are lost usually during that time from reason of suffocation, overcrowding, lack of well-distributed heat, and diseases promoted thereby, this loss frequently amounting to forty or fifty per cent. I have designed and successfully used a brooder which overcomes these disadvantages in a very great measure and which in actual practice has reduced the loss to about fifteen per cent.

The invention consists of the parts and the construction and the combination of parts, as hereinafter more fully described and claimed, having reference to the accompanying drawings, in which—

Figure 1:
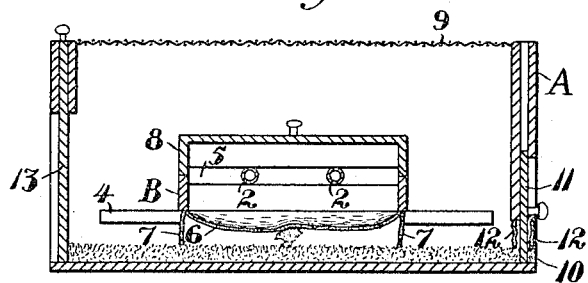
Figure 2:
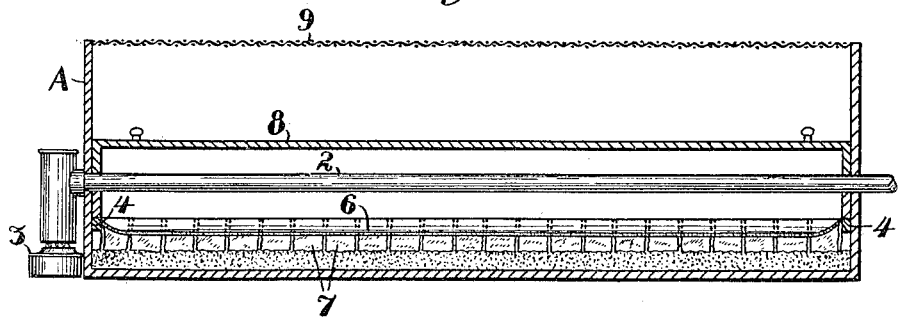

Figure 1 is a transverse sectional view of my brooder. Fig. 2 is a longitudinal sectional view of same.

A represents a low outer box forming an inclosure for the young chicks, which box may be of any suitable shape or size. In practice I sometimes make it eight feet long and five feet wide and adapted to contain two hundred and fifty and upward of young chicks. There may be one or more of these boxes arranged in line and all heated from the same source of heat. For purposes of illustration I have only shown one box or unit.

The heating is done by passing a suitable heating medium, as hot water, steam, or hot air, through the pipes 2, which extend lengthwise through the box and at a suitable distance above the bottom of the box, the heat circulating outward through one pipe and returning by the other pipe. I have shown a lamp, as 3, to supply the necessary heat.

B is a shallow frame without top or bottom extending the full inside length of the box A and mounted to slide transversely of the box A on the guides 4. The ends of the frame B are suitably slotted or cut away, as at 5, to accommodate the pipes 2 and allow the sidewise reciprocation of the frame without interfering with the pipes. The frame B has a sagging bottom 6 of soft pliable cloth or other fabric and is mounted just high enough above the sand-covered floor of the box A to allow the backs of the chicks to lightly touch this bottom or hover, mother-hen fashion. Along the opposite edges of the frame are fixed the flexible strips 7, which depend to the floor of the box A and between which strips the chicks may pass in and out easily. The top of the frame B is covered by a removable cover 8, which retains the radiated heat from the pipes 2 and deflects it downward onto the fabric or hover 6. This keeps the backs of the little chicks warm whenever they happen to be in the frame no matter where they may stand, and thus avoids a fruitful source of loss caused by overcrowding to get near the heating-pipes.

The heat for the brooder-chamber is derived entirely by radiation from the pipes 2 and there are no noxious gases or vapor admitted to the chamber. The heat is evenly distributed and passes easily and directly through the hover-cloth 6 into the chamber and to the chicks which are in contact with the hover. The latter is allowed to sag just enough to simulate the body of a mother-hen.

The top of the outer box A is covered with a screen 9, so that the space roundabout the brooder-frame B is open to the pure air. The space within the box A and outside of frame B forms a runway and a feeding and exercising area for the chicks. If desired, an opening 10 in box A may be provided and closable by a slide 11. Flexible strips 12 depend across this opening, between which strips the chicks may pass in and out when the slide 11 is open. A suitable door 13 may be provided opposite for access to the box.

The object of mounting the frame B on the slides 4 is to enable this frame to be easily moved from side to side in raking over and cleansing the bottom of box A, as is frequently necessary to keep the chicks in a healthy condition. By having the frame shiftable in this fashion the hover for the chicks is not raised and the chicks may still take refuge under there and not be frightened during the cleaning-up operation.

The use of the outside inclosure A is of great importance in that it gives the chicks a chance to get away from the heat without leaving brooder. With the brooders commonly in use the heat is all in the box itself and the chicks in order to get away from the heat have to get out into the room and the change in temperature is too great for them. In most brooders when closed in for the night the chicks have no way of getting out if anything goes wrong with the heat. On the other hand, with my apparatus the chicks can get out from under the hover in case it gets too hot and still be in the brooder, the outside inclosure being warm enough so that no injury from sudden cold will come to the chicks. This feature with that of the cheap cost of warming a large number at one time are of great importance in the practical success of my brooder.

Having thus described my invention, what I claim, and desire to secure by Letters Patent, is—

1. In a brooder, the combination of an outer box, a shallow frame mounted in said box and shiftable in a horizontal plane therein, said frame inclosing a heating-chamber, communications between the heating-chamber and a source of heat, and a soft flexible bottom for said frame sagging below the frame to permit the back of the chicks therebeneath to come in light contact with it.

2. In a brooder, the combination of an outer box, a frame slidably mounted in said box and inclosing a heating-chamber, communications between said chamber and a source of heat, a flexible sagging bottom for said frame and composed of soft material arranged to contact with the back of the chicks therebeneath, and depending flexible strips secured to the frame.

3. In a brooder, the combination of an outer box, heating-pipes passing through said box, a frame slidably mounted in the box and through which the said heating-pipes pass, said frame having its ends cut away to accommodate the pipes, a removable cover for said frame, and a flexible sagging bottom for the frame, said bottom being in direct contact with the heated atmosphere of the heating-chamber and sagging to permit the backs of the chicks to come in light contact with it.

In testimony whereof I have hereunto set my hand in presence of two subscribing witnesses.

LOUIS W. CLARK.

Witnesses:
JAS. PEOPLES,
D. B FAIRBANKS.